(No Model.)

E. PECKHAM.
CAR WHEEL.

No. 376,723. Patented Jan. 17, 1888.

WITNESSES:
A. F. Walz,
C. L. Bendicon.

INVENTOR:
Edgar Peckham
BY
Drull, Laass & Drull
ATTORNEYS.

UNITED STATES PATENT OFFICE.

EDGAR PECKHAM, OF SYRACUSE, NEW YORK, ASSIGNOR TO THE PECKHAM CAR WHEEL COMPANY, OF NEW YORK.

CAR-WHEEL.

SPECIFICATION forming part of Letters Patent No. 376,723, dated January 17, 1888.

Application filed October 20, 1887. Serial No. 252,897. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention pertains to the class of wheels which are provided with a non-metallic core in the body or web portion of the wheel.

The invention consists, first, in locking the tire directly on one of the web-plates of the body, and thus obtaining a more secure hold between the tire and body; secondly, in forming the inner peripheral face of the outer ring of the wheel-body with circumferential steps, and forming the outer peripheral face of the non-metallic core with corresponding steps seated on those of the aforesaid ring, thereby securely locking the ring on the core; and the invention also consists in tying the ring on the core by bolts or rivets passing transversely through the aforesaid stepped portions of said parts, all as hereinafter more fully described, and specifically pointed out in the claims.

Figure 1:
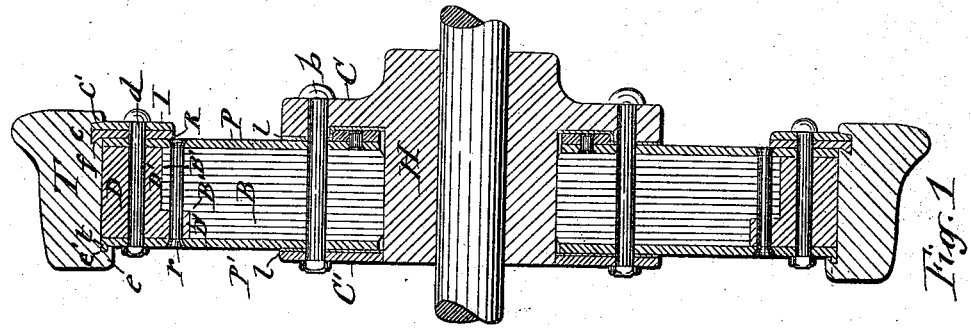
Figure 2:
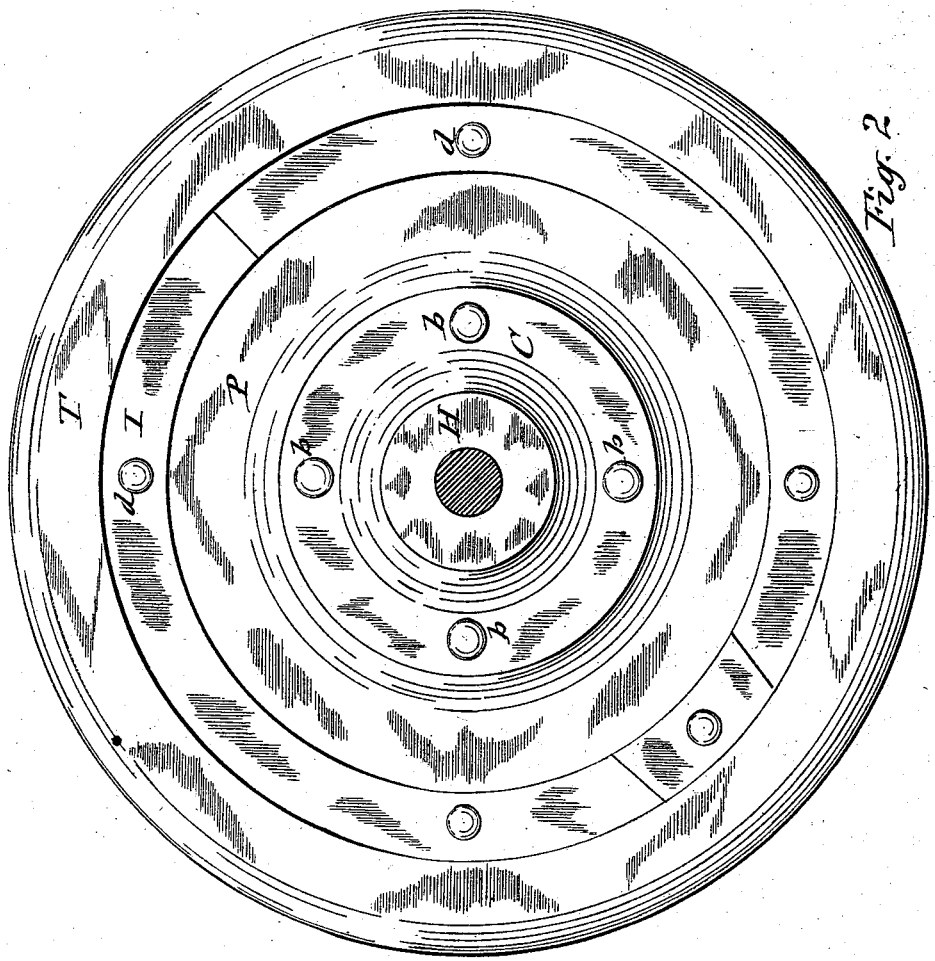

Referring to the annexed drawings, Figure 1 is a transverse section of a wheel embodying my improvements, and Fig. 2 is an inner face view of said wheel.

Similar letters of reference indicate corresponding parts.

H represents the hub of the wheel, which hub may be of any suitable and well-known shape to support the body of the wheel. In the construction shown in the annexed drawings the hub is provided with a collar, C, cast in one piece therewith, and against the front of the said collar rests the body of the wheel mounted on the hub and confined in its position by a collar, C', mounted removably on the outer end of the hub, and bolts or rivets b, passing through the two collars C C' and intervening body.

The body of the wheel is composed of two web-plates, P P', secured at their peripheral portions to opposite sides of the ring D and inclosing the core B, of paper or other suitable non-metallic material. In order to allow the core B to rest upon the hub, and thus cushion the wheel, I make the central eyes of the web-plates of greater diameters than the hub, so as to leave a space, s, between said parts, and thus prevent said plates from bearing on the hub. To the side of the plate P, near the central eye thereof, I rivet one or more lugs, p, which project into corresponding recesses, n, in the adjacent side of the rigid collar C, and thus lock the wheel-body on the hub, so as to compel said parts to rotate in unison and prevent shearing strain on the bolts or rivets b. Linings l l, of paper or other suitable material, are interposed between the sides of the body and collars C C', to prevent the jarring of the web-plates. The inner peripheral face of the ring D, I form with one or more circumferential steps, D', of different diameters, and the peripheral face of the core B, I form with corresponding circumferential steps, B', by which the core is seated on the aforesaid stepped face of the ring. This construction and combination of parts forms shoulders or side bearings, O, which throw directly onto the core the lateral strain incident to the pressure of the flange of the tire against the side of the track-rail.

T represents the tire, which I secure to the described body of the wheel by forming the tire at one side of its inner peripheral face with the inward projection e, having the groove e' on its inner wall, and providing the opposite side of the peripheral face of the tire with a groove, c, which has its inner wall undercut and its outer wall beveled in the same manner as described in another application for patent of even date herewith. Both web-plates terminate flush with the outer periphery of the ring D. The plate P', at the outer side or front of the wheel, I provide with an outward-projecting circumferential tongue, t, around its periphery, which tongue is inserted into the groove e' of the tire. The extra retaining-ring shown on said side of the wheel in the other application for patent, before mentioned, is in this case dispensed with, and the lock of the tire on the body is rendered more positive and secure. At the opposite side of the wheel I employ the retaining-ring R and locking-ring I, similar to those shown in my other application for patent aforesaid, said rings being divided into sections to allow them to be inserted into the groove c, the ring R being provided with the inward projection f to interlock with the undercut wall of the groove, and the ring I being beveled at its outer edge to engage the beveled wall of the groove and wedge the ring R into its bearing in the groove. Bolts d, passing transversely through the rings R I, web-plates P P', and intervening ring, D, securely unite said parts.

In order to brace the plates P P', so as to better sustain the core B, I insert bolts or rivets r, passing through the plates and through the stepped portions of the ring D and core B.

Having described my invention, what I claim as new, and desire to secure by Letters Patent, is—

1. In combination with the core B and outer ring, D, the web-plate P', secured to said ring and formed with the outward-projecting tongue t, and the tire T, formed with the inward projection e, having the groove e' in its inner side and interlocking with the tongue t, substantially as described and shown.

2. In combination with the core B and outer ring, D, the web-plates P P', having their peripheries flush with that of the ring, the tongue t, projecting outward from the plate P', the tire T, provided with the projection e, and groove e' in said projection, interlocking with the tongue t, and the groove c in the inner peripheral face of the tire, having an undercut inner wall and beveled outer wall, the sectional retaining-ring R, provided with the inward projection f, the locking-ring I, beveled at its outer edge, and both entering the groove e, and bolts or rivets d, passing through said rings and plates P P', substantially as described and shown.

3. In combination with the hub and tire, the ring D, having its inner peripheral face formed with circumferential steps of different diameters, the non-metallic core B, formed with corresponding steps seated on those of the aforesaid ring, and plates P P', embracing between them the said core and ring, substantially as set forth.

4. In combination with the hub and tire, the ring D, having its inner peripheral face formed with circumferential steps of different diameters, the non-metallic core B, formed with corresponding steps seated on those of the aforesaid ring, the plates P P', embracing between them the said ring and core, retaining-rings R S, interlocked with the tire, and bolts or rivets r, passing transversely through the retaining-rings, plates, and through the stepped portion of the ring D and core B, and uniting said parts, substantially as described and shown.

In testimony whereof I have hereunto signed my name, in the presence of two witnesses, at Syracuse, in the county of Onondaga, in the State of New York.

EDGAR PECKHAM. [L. S.]

Witnesses:
HOWARD P. DENISON,
C. L. BENDIXON.